(12) United States Patent
Kim

(10) Patent No.: US 11,520,309 B2
(45) Date of Patent: Dec. 6, 2022

(54) OPERATING SYSTEM FOR ADVERTISEMENT-TYPE 3D PRINTER COMPATIBLE WITH IOT

(71) Applicant: BIO MEDICAL 3D PRINTING CO., LTD., Seoul (KR)

(72) Inventor: Nam Soo Kim, Seoul (KR)

(73) Assignee: BIO MEDICAL 3D PRINTING CO., LTD., Seoul (KR)

( * ) Notice: Subject to any disclaimer, the term of this patent is extended or adjusted under 35 U.S.C. 154(b) by 601 days.

(21) Appl. No.: 16/496,007

(22) PCT Filed: Nov. 13, 2017

(86) PCT No.: PCT/KR2017/012766
§ 371 (c)(1),
(2) Date: Sep. 20, 2019

(87) PCT Pub. No.: WO2018/174366
PCT Pub. Date: Sep. 27, 2018

(65) Prior Publication Data
US 2021/0116883 A1    Apr. 22, 2021

(30) Foreign Application Priority Data

Mar. 20, 2017  (KR) .................... 10-2017-0034612

(51) Int. Cl.
*G05B 19/4099* (2006.01)
*G06F 3/12* (2006.01)
(Continued)

(52) U.S. Cl.
CPC .......... *G05B 19/4099* (2013.01); *B33Y 99/00* (2014.12); *G06F 3/1203* (2013.01); *G06F 3/1207* (2013.01); *G06F 3/1256* (2013.01); *G06F 3/1259* (2013.01); *G06F 3/1292* (2013.01); *G06Q 30/0252* (2013.01);
(Continued)

(58) Field of Classification Search
None
See application file for complete search history.

(56) References Cited

U.S. PATENT DOCUMENTS

2012/0092724 A1    4/2012  Pettis
2017/0218660 A1*   8/2017  Muchna ................ B33Y 50/00

FOREIGN PATENT DOCUMENTS

CN    104647756 A    5/2015
KR    20150116584 A   10/2015
(Continued)

OTHER PUBLICATIONS

Translation of KR 2015-0116584 (Year: 2015).*
(Continued)

*Primary Examiner* — Lennin R Rodriguezgonzalez
(74) *Attorney, Agent, or Firm* — Barcelo, Harrison & Walker, LLP

(57) ABSTRACT

The present invention relates to an operating system using an advertisement-type 3D printer, the system integrally managing individual 3D printers in an Internet of Things (IoT) cloud data environment by operating a platform on a network, and being capable of individual advertising, Internet advertising, closed captioning, regional broadcasting, and total advertising, and advertising for individual sections/job types in the 3D printers.

7 Claims, 5 Drawing Sheets

(51) Int. Cl.
　　　*G09F 23/00*　　　(2006.01)
　　　*B33Y 99/00*　　　(2015.01)
　　　*G06Q 30/02*　　　(2012.01)
　　　*H04L 65/40*　　　(2022.01)
(52) U.S. Cl.
　　　CPC .............. *G09F 23/00* (2013.01); *H04L 65/40* (2013.01); *G05B 2219/49023* (2013.01); *G06Q 30/0241* (2013.01)

(56) References Cited

FOREIGN PATENT DOCUMENTS

| KR | 20150116694 A | 10/2015 |
|----|---------------|---------|
| KR | 20160041240 A | 4/2016  |
| KR | 20160077950 A | 7/2016  |
| KR | 101647800 B1  | 8/2016  |
| KR | 20170110949 A | 10/2017 |
| KR | 20180024519 A | 3/2018  |

OTHER PUBLICATIONS

Korean Patent Abstract (in English) of Korean Pattent App. Pub. No. KR10-2017-0110949-A, Pub. Date Oct. 12, 2017, downloaded Sep. 19, 2019, from https://worldwide.espacenet.com.

Korean Patent Abstract (in English) of Korean Pattent App. Pub. No. KR10-2018-0024519-A, Pub. Date Mar. 8, 2018, downloaded Sep. 19, 2019, from https://worldwide.espacenet.com.

Korean Patent Abstract (in English) of Korean Pattent App. Pub. No. KR10-2015-0116584-A, Pub. Date Oct. 16, 2015, downloaded Sep. 19, 2019, from https://worldwide.espacenet.com.

Korean Patent Abstract (in English) of Korean Pattent App. Pub. No. KR10-2016-0077950-A, Pub. Date Jul. 4, 2016, downloaded Sep. 19, 2019, from https://worldwide.espacenet.com.

Korean Patent Abstract (in English) of Korean Pattent App. Pub. No. KR10-2016-0041240-A, Pub. Date Apr. 18, 2016, downloaded Sep. 19, 2019, from https://worldwide.espacenet.com.

Korean Patent Abstract (in English) of Korean Pattent App. Pub. No. KR10-2015-0116694-A, Pub. Date Oct. 16, 2015, downloaded Sep. 19, 2019, from https://worldwide.espacenet.com.

Korean Patent Abstract (in English) of Korean Pattent App. Pub. No. KR10-1647800-B1, Pub. Date Aug. 11, 2016, downloaded Sep. 19, 2019, from https://worldwide.espacenet.com.

Chinese Patent Abstract (in English) of Chinese Pattent App. Pub. No. CN104647756-A, Pub. Date May 27, 2015, downloaded Sep. 19, 2019, from https://woridwide.espacenet.com.

Office Action (in Korean) for KR Patent Application No. KR10-2018-0025731, dated Aug. 1, 2019.

\* cited by examiner

OPERATING SYSTEM FOR ADVERTISEMENT-TYPE 3D PRINTER COMPATIBLE WITH IOT

CROSS-REFERENCE TO RELATED APPLICATIONS

This application is the national stage for International Patent Cooperation Treaty Application PCT/KR2017/012766, filed on 13 Nov. 2017, which claims priority from Korean Patent Application No. 10-2017-0034612, filed on 20 Mar. 2017, in the Korean Intellectual Property Office. The entire contents of said applications are incorporated herein by reference for all purposes.

BACKGROUND

Technical Field

The present invention relates to a 3 Dimension (3D) printer, and particularly, to an operating system for an advertisement-type 3D printer compatible with an Internet of Things (IoT).

Background Art

Modern people are exposed to the aesthetics of the faster and are not practiced in waiting. Modern people want a visual stimulus even for a short time like using a cellular phone when walking on a road. Such a result greatly affects advertising. Advertisements have evolved significantly this century, taking advantage of the fact that people enjoy being exposed to visual stimuli. In modern society, an influence range of the advertising is vast. It is no exaggeration to say that the advertising represents a modern society. The development of advertisements and the development of media have resulted in a result which may be regarded as an error, which has made people want more and more visual stimulus. Therefore, when using advertising 3D equipment, it is possible to perform more effective and stimulant advertising through the visual stimulus that can see the movement of the 3D equipment and the visual stimulus of the color or image in which the media can be used.

People are no longer interested in a 3D printer itself. Like today's smartphones, multifunctional 3D printers will eventually become an element interesting to people. One disadvantage of 3D printing is that you have to wait for the printing time. Especially in the case of food or nail printing, an element to be visually displayed is required during the waiting time because the customer has to deliver food or nail printing after printing in front of the customer who waits. Nevertheless, there is a problem that there is no 3D printer that can perform advertising at present.

As prior related documents, Patent Application Nos. 10-2016-0035412, filed on 24 Mar. 2016, and 10-2016-0110877, filed on 30 Aug. 2016, can be referred to.

DISCLOSURE

Technical Problem

Accordingly, the present invention is contrived to solve the above-described problem and an object of the present invention is to provide an operating system using an advertising type 3D printer which can integrally manage individual 3D printers in an Internet of Things (IoT) cloud data environment by operating a platform on a network and being capable of individual advertisings, Internet advertising, closed captioning, regional broadcasting, and total advertising, and advertising for individual sections/job types in the 3D printers.

In addition, another object of the present invention is to provide an operating system using an advertisement-type 3D printer which can use the operating system that can be remotely controlled and printed using a mobile function from the outside without a printer because it is possible to use IoT, and the monitor (LCD, which can provide advertisement and serve as TV (television) provided outside the printer LED, OLED, etc.) to make efficient use of printing time, and also to provide multimedia contents such as advertisements, movies, and videos related to products provided by the printer (3D printed food, ceramics, nail art, etc.) to efficiently use time and space by providing the multimedia contents through a monitor installed in a wall mounted type printer.

Technical Solution

First, when a feature of the present invention is summarized, in order to achieve the object of the present invention, a 3D printer operating system according to an embodiment of the present invention includes: a housing with one or more display panels on an outer surface as a form to surround a 3D printer; and a control device controlling opening/closing of a door surface of the housing according to an opening/closing request of a user and performing operation control of the 3D printer installed in the housing and operation control of the display panel, in which the control device controls to extract related contents corresponding to 3D work data from a memory and reproduce the extracted contents on the display panel while controlling the 3D printer to produce a 3D object according to the 3D work data.

The 3D printer operating system may further include a camera installed in the housing and photographing a producing process of the 3D printer, in which the control device selectively displays an image of the camera or the related contents on the display panel according to an image request of the user.

The 3D printer as a printer of a form installed on a wall surface or a desktop form occupying a space on a desk or a floor may be a form in which a printer head movable on an X axis, a Y axis, and a Z axis sprays a material onto a worktable to produce the 3D object according to control of the control device and may promote useful information including advertisements or other multimedia contents by interworking with a cloud server on a network in real time.

The control device may interwork with a user terminal according to a relay of a platform on the network, overall control of the control device through the user terminal may be possible, and the control device may transmit and provide the image displayed on the display panel to the user terminal.

The control device may include Arduino board hardware for controlling the 3D printer, and Raspberry Pi hardware for controlling the display panel and perform control of an entire system by interworking both hardware.

The control device may interwork with the user terminal according to the relay of the platform on the network and while producing the 3D object according to original image data as the 3D work data transmitted by the user terminal, the control device may provide a corresponding original image and an image for the producing process of the 3D object obtained through the camera installed in the housing to the display panel and transmit and provide the images to the user terminal.

A server on the network, which senses a temperature, a humidity, an event, or an accident in the housing and receives transmitted sensor information may provide to the display panel an advertisement according to seasons or environments by analyzing the sensor information.

By interworking with the server on the network, the server may store and manage 3D object information including information on a 3D object produced or to be produced by the 3D printer, which includes a picture, a design, or a material in a database and support the 3D printer to produce the 3D object selected among the 3D object information through online payment.

So as to enable precise comparison analysis with the related 3D object previously produced, the server may provide to the display panel the image for the producing process of the 3D object obtained through the camera installed in the housing.

Advantageous Effects

According to the operating system using the advertisement-type 3D printer according to the present invention, by providing a multimedia content such as advertisements, movies, videos through a monitor provided in the printer, consumers may not get bored without time spent on printing in the middle of printing. The printer company provides advertising to consumers in the middle of printing to make money with advertising rates.

In addition, by operating the platform on the network to support the IoT, it is possible to remotely control the printer and perform printing from a distance using mobile functions, and to analyze and respond to the situation of equipment such as 3D printers and consumers in the field directly.

In addition, it is possible to enable a system that preorders products with the image through a user terminal on a network, such as the Internet, or prints and automatically keeps the ordered products in a printer installed on a wall such as a wall hanging, and automatically settles the products by a password in a keypad or the user terminal, and thereafter, directly picks up the product without a help of a clerk.

DETAILED DESCRIPTION

Best Mode

Figure 1:
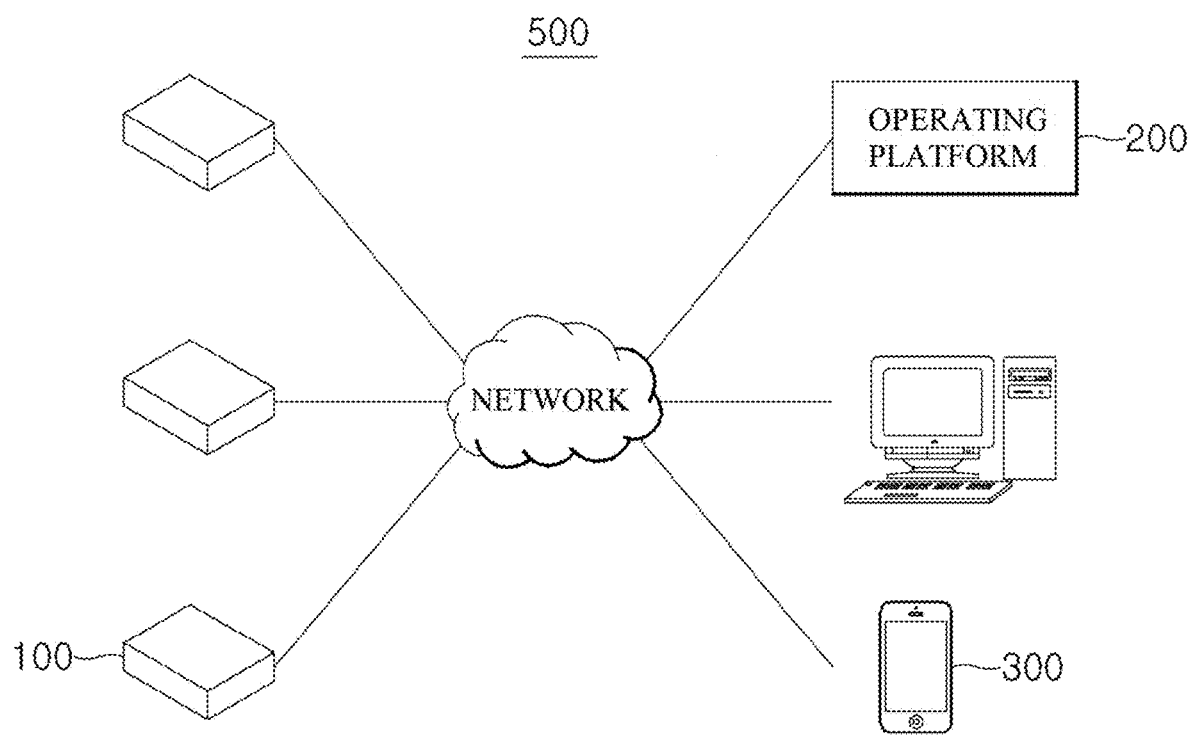
FIG. 1 is a diagram for describing a 3D printer operating system according to an embodiment of the present invention.

Hereinafter, the present invention will be described in detail with reference to the accompanying drawings. In this case, the same components in each drawing are represented by the same reference numerals as much as possible. In addition, detailed descriptions of already known functions and/or configurations are omitted. The following description focuses on parts necessary for understanding the operation according to various embodiments, and descriptions of elements that may obscure the gist of the description are omitted. In addition, some components of the drawings may be exaggerated, omitted, or schematically illustrated. The size of each component does not entirely reflect the actual size, and thus the contents described herein are not limited by the relative size or spacing of the components drawn in the respective drawings.

FIG. 1 is a diagram for describing a 3D printer operating system 500 according to an embodiment of the present invention.

Referring to FIG. 1, the 3D printer operating system 500 according to an embodiment of the present invention includes a plurality of 3D printer housing devices 100, a server-type operating platform 200, and a plurality of user terminals 300 interoperable on a network.

Here, the network may be a network supporting wired communication or wireless communication such as wired Internet communication, wireless Internet communication such as WiFi, WiBro, mobile communication such as WCDMA, LTE, and the like.

The user terminal 300 may include a wireless terminal such as a smart phone, a wearable device capable of making a voice/video phone call, a tablet PC, a notebook PC, and the like and besides, may also include a wired terminal such as a desktop PC and other communication-only terminals in some cases. The user terminal 300 may be equipped with an application capable of the Internet of Things (IoT) in order to receive the 3D printer operation related service of the present invention.

The 3D printer housing device 100 will be described in FIG. 3, but briefly, while one or more display panels are mounted on the outer surface of the housing that surrounds the 3D printer to controls the 3D printer to product a 3D object, multimedia contents such as a (commercial) advertisement, a movie, a video, and the like may be displayed on the display panel, and an image of a producing process of a 3D printer photographed by a camera installed in a housing may be displayed on the display panel. As such, the 3D printer housing device 100 provides multimedia contents such as advertisements, movies, and videos through a monitor, that is, the display panel, so that consumers may not get bored without wasting time while printing and a printer company provides advertising to consumers in the middle of printing so that the printer company may make money with advertising rates.

Figure 2:
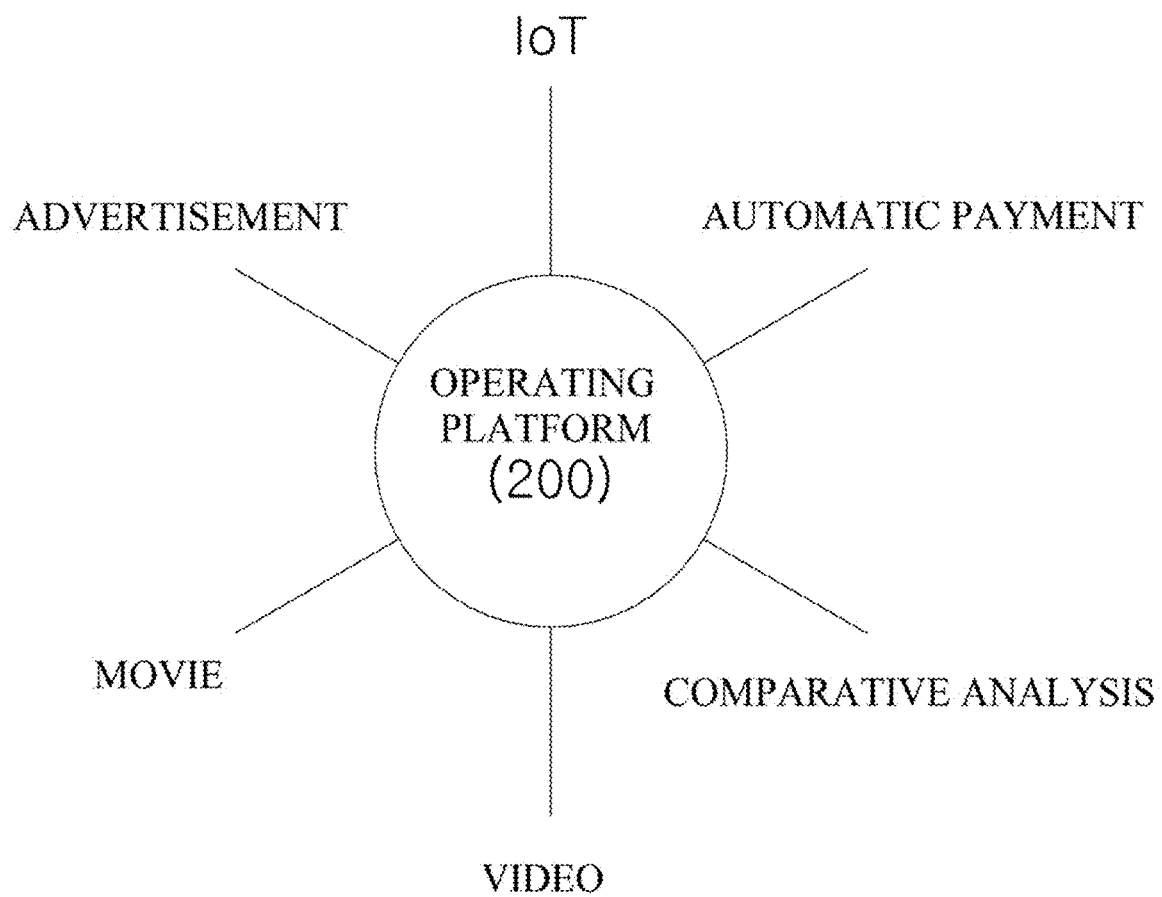
FIG. 2 is a diagram for describing an operation of an operation platform of FIG. 1.

As shown in FIG. 2, the operating platform 200 may provide multimedia contents such as advertisements, movies, and videos to the 3D printer housing device 100, and manage subscription information for users who receive a 3D printer operation related service of the present invention through the user terminal 300 and relay various control or necessary information transmission and reception between the user terminal 300 and the 3D printer housing device 100. According to the relay of the operating platform 200, the users may remotely manipulate the movement of the 3D printer of the 3D printer housing device 100 using the user terminal 300 equipped with an application equipped with an IoT function, and also print a 3D object of a desired design.

In addition, the operating platform 200 may manage information (e.g., design, material, etc.) about the 3D objects printed and produced by the 3D printer housing device 100 in a database, and analyze data such as the design, the material, etc., for the 3D object printed and produced based on accumulated information and determine a preference of the customer and provide corresponding schematic information to the user terminal 300. In addition, based on the accumulated information, the operating platform 200 may analyze big data on strategic service sales, company operations, and safety status of equipment such as the 3D printer housing device 100 afterwards, and directly provide a meaningful analysis result applicable to an advertisement contract with an advertising company immediately on the spot.

In addition, according to the relay of the operating platform 200, the overall control of the control device of the 3D printer housing device 100 in the user terminal 300 is possible, and accordingly the control device of the 3D printer housing device 100 may transmit and provide the image displayed on the display panel to the user terminal 300.

The 3D printer housing device 100 may print and produce the 3D object according to original image data which is 3D work data transmitted from the user terminal 300 and in this case, during the producing, the control device of the 3D printer housing device 100 may provide to the display panel the original image and an image for the corresponding 3D object acquired through a camera installed in the housing and further, transmit and provide the provided image even to the user terminal 300.

For example, when the user terminal 300 transmits image data regarding a face of a person, a photographic text, initials, caricatures, and the like, the 3D printer housing device 100 may print and produce the 3D object with materials including cookies, bread, chocolate, jelly, cream, and jam and the original image and an image during a producing process of the 3D object are displayed in the display panel on the spot and provided even to the user terminal 300 and compared and analyzed during printing.

As such, in the present invention, by operating the operating platform 200 on the network to support the IoT, it is possible to remotely control the printer and perform printing from a distance from the user terminal 300 using mobile functions, and to analyze and respond to the situation of equipment such as 3D printers and consumers in the field directly. In addition, it is possible to enable a system that preorders products with the image through a user terminal 300 on a network, such as the Internet, or prints and automatically keeps the ordered products in a printer installed on a wall such as a wall hanging, and automatically settles the products by a password in a keypad or the user terminal, and thereafter, directly picks up the product without a help of a clerk.

Figure 3:
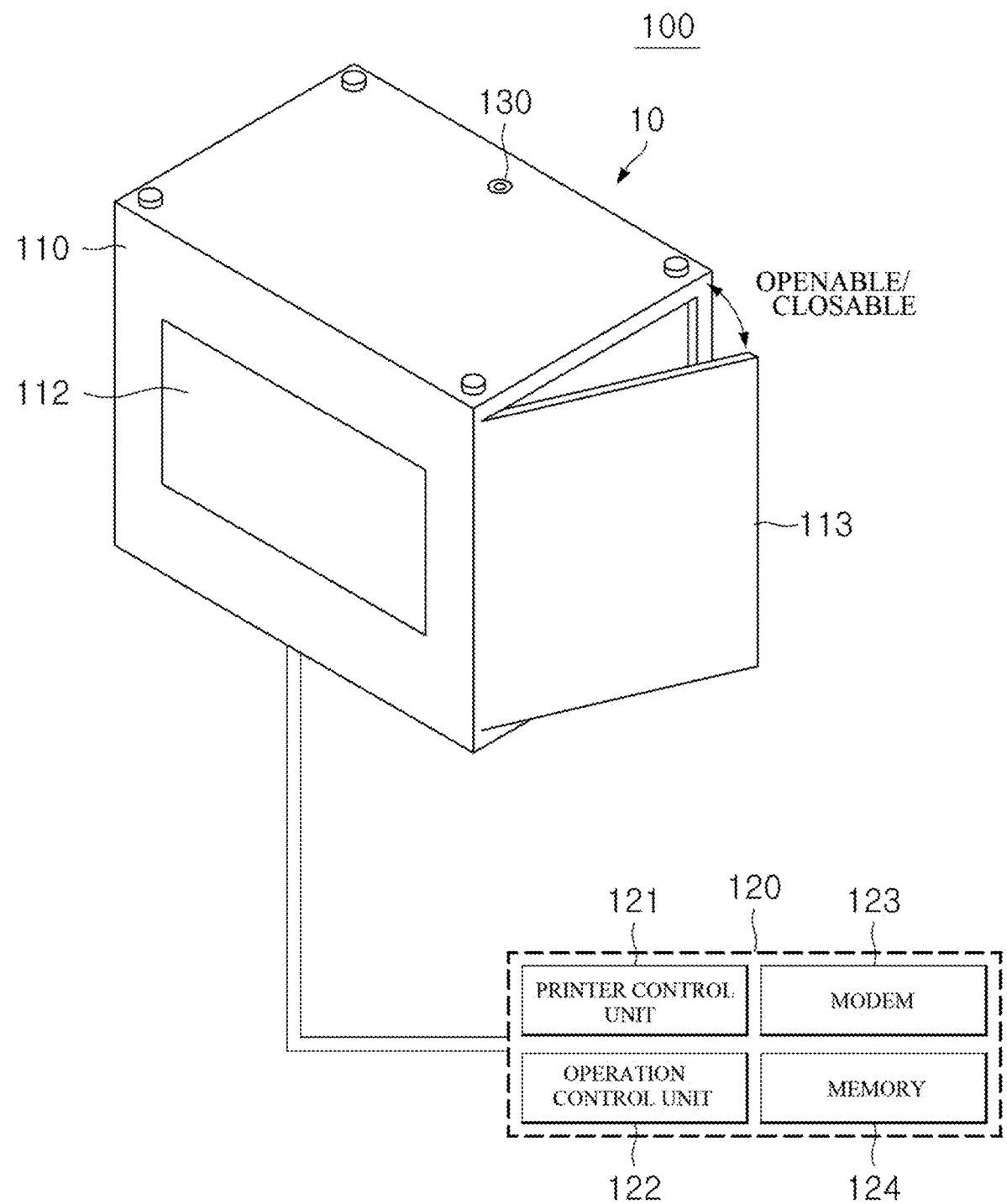
FIG. 3 is a diagram for describing a 3D printer housing device according to an embodiment of the present invention.

FIG. 3 is a diagram for describing a 3D printer housing device 100 according to an embodiment of the present invention.

Referring to FIG. 3, the 3D printer housing device 100 according to an embodiment of the present invention includes a housing 110 surrounding a 3D printer 10 (see FIG. 4) installed on a wall surface or the like, and a control device 120 for overall control, and a camera 130 installed at a position capable of appropriately photographing a situation inside the housing 110.

Figure 4:
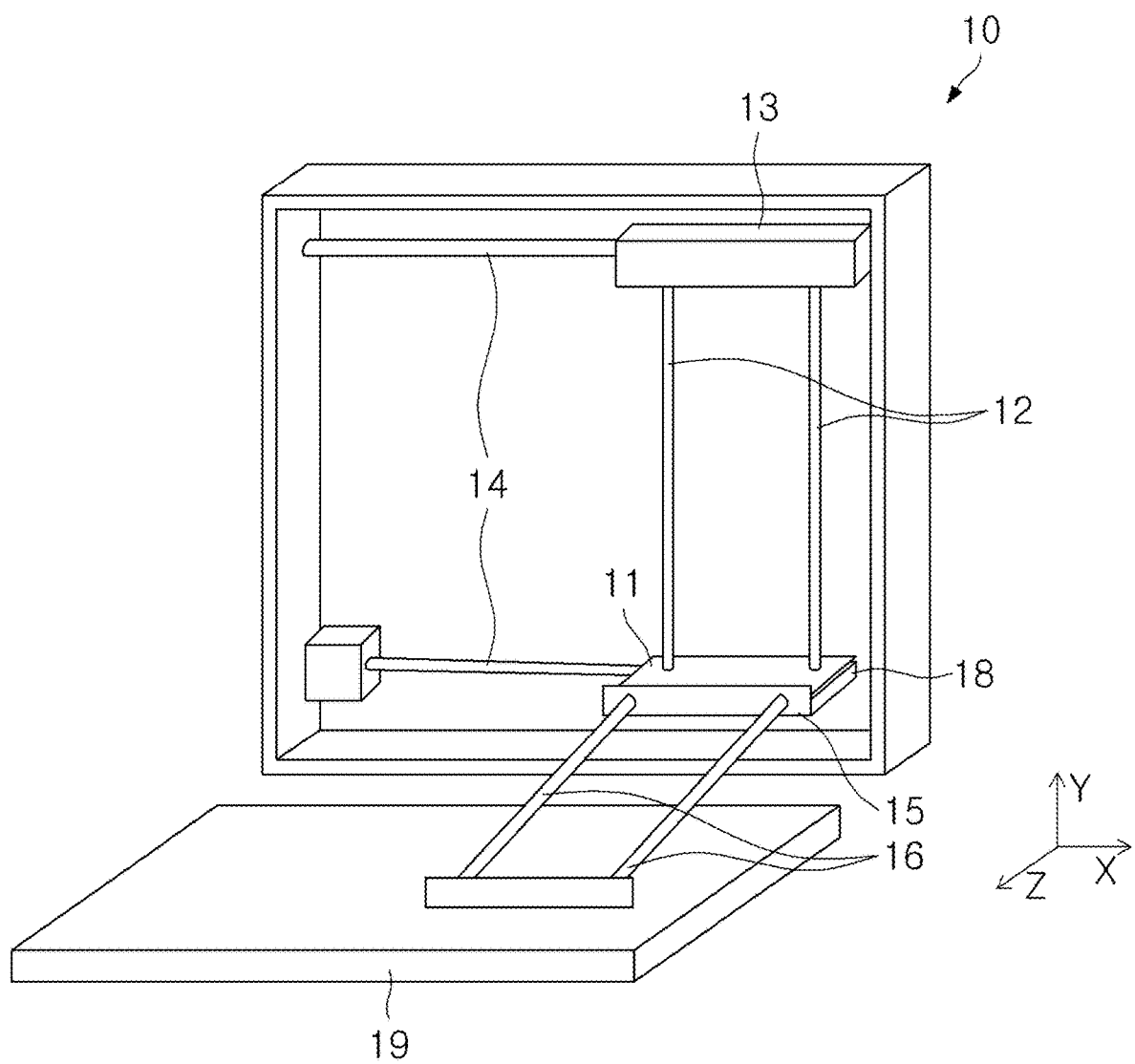
FIG. 4 illustrates an example of a 3D printer of FIG. 3.

The 3D printer 10 may be installed on a wall surface of an internal space such as an office, and may be a form in which under the control of the control device 120, a print head 15 that is movable in three axes, that is, X, Y, and Z axes, which are perpendicular to each other sprays a material on a worktable 19 to produce the 3D object. For example, the 3D printer 10 is as illustrated in FIG. 4. Guide blocks 13 and 18 move along an X-axis direction rail 14 and thus the print head 15 on a Z-axis direction rail 16 coupled to a movable block 11 on the guide block 18 may be adjusted to an X-axis working position. The print head 15 can be moved along the Z-axis direction rail 16 to be adjusted to a Z-axis working position. In addition, the movable block 11 on the guide block 18 is movable along the Y-axis direction rail 12, and in this case, the print head 15 on the Z-axis direction rail 16 coupled to the movable block 11 may also be moved in a Y-axis direction and adjusted to a Y-axis working position.

As illustrated in FIG. 3, the 3D printer 10 may be installed on the wall surface or the like, and the housing 110 may be coupled in a form in which the housing 110 is in close contact with the wall surface so that the 3D printer 10 enters one opened surface to accommodate the 3D printer 10 therein. The housing 110 may have an opened inner surface in the form of a hexahedron as shown in the drawing, but is not limited thereto and in some cases, the entire hexahedron is sealed and any one surface (e.g., a door surface 113) is opened to accommodate the 3D printer 10 therein or the housing 110 may be constituted by surfaces having a curve shape instead of the hexahedron constituted by rectangular surfaces and may appropriately accommodate the 3D printer 10 therein.

For example, the 3D printer 10 may be a desktop type printer occupying a space in a desk or a floor and may be a form in which the printer head which is movable on the X axis, the Y axis, and the Z axis sprays the material onto the worktable according to the control of the control device 120 to produce the 3D object. In this case, one or more display panels 112 may be mounted on the outer surface surrounding the 3D printer 10. The housing 110 may be coupled in such a form in which the housing 110 is in close contact with the desk or floor so as to accommodate the 3D printer 10 therein or a form to accommodate a desktop type printer in the sealing type housing 110.

In addition, a camera 130 for photographing a producing process of the 3D printer 10 is installed in the housing 110 (e.g., the inner surface of the housing or a wall surface on which the 3D printer is installed), and one or more display panels 112 are mounted on the outer surface of the housing 110. The display panel 112 may be provided at various locations according to an appropriate location of the outer surface of the housing 110 as necessary.

The control device 120 may include a printer control unit 121 for controlling the overall operation of the 3D printer 10, such as printing production of the 3D object of the 3D printer 10, an operation control unit 122 for overall operation control of the display panel 112 such as the display of the multimedia contents such as advertisements, movies, and videos related to the printed 3D object or control such as opening/closing control of the door surface 113 of the housing 110 according to an opening/closing request of a user, and a modem 123 supporting communication with the operating platform 200 or the user terminal 300 on the network. The memory 124 may store data or configuration information required for a service of the present invention and besides, store the multimedia contents including the advertisement, the movie, the video, and the like.

Each component of the control device 120 may be implemented in hardware such as a semiconductor processor, software such as an application program, or a combination thereof. In addition, although the printer control unit 121 (e.g., Arduino) and the operation control unit 122 (e.g., Raspberry Pi 3) may be configured separately, any one control unit may integrate and operate the function. Arduino hardware (board) may be programmed and controlled in the integrated development environment, and Raspberry Pi hardware (board) is programmed through an internal operating system directly installed in Raspberry Pi unlike Arduino, which is programmed in external programs. Such hardware can be interlocked to control the entire system and since these are well known, detailed description thereof will be omitted.

On the display panel 112, necessary interface information such as various control menus for providing to the user for operation control of the printer control unit 121 or the operation control unit 122 may be displayed, and the user may implement on the display panel 112 and the user may input an operation of the 3D printer 10 or the display panel 112 or a command for opening/closing of the door surface 113 through selection or information input through interface information by using a touch screen function implemented on the display panel 112.

The operation control unit 122 controls the opening/closing of the door surface 113 of the housing 110 according to the opening/closing request of the user to enable the 3D object produced by the 3D printer 10 to be delivered by opening the door surface 113 and another 3D object to start to be produced by closing the door surface 113.

The printer control unit 121 of the control device 120 controls the 3D printer 10 to produce the 3D object according to input 3D work data (e.g., image, designed design code data, etc.) and while the 3D object is produced, the operation control unit 122 may control to extract related contents corresponding to the 3D work data from the memory 124 and reproduce the contents on the display panel 112. The 3D work data may be directly input through the control device 120 and received and input from the operating platform 200 or the user terminal 300.

The memory 124 may store the multimedia contents including the advertisement, the movies, the videos, and the like and the multimedia contents may be directly input and stored through the control device 120 and received from the operating platform 200 or the user terminal 300 and stored and managed. For example, the 3D work data may include image data about a person's face, photographic text, initials, caricatures, or designed design code data, material information such as cookies, bread, chocolate, jelly, cream, or jam and may further include a name (e.g., cakes, miniatures, flowers, nails, etc.) of the 3D object as necessary. The operation control unit 122 may refer to attribute information such as titles and summaries of the contents of the memory 124, and extract related contents (e.g., advertisements, movies, and videos) corresponding to the information of the 3D work data from the memory 124.

Figure 5:
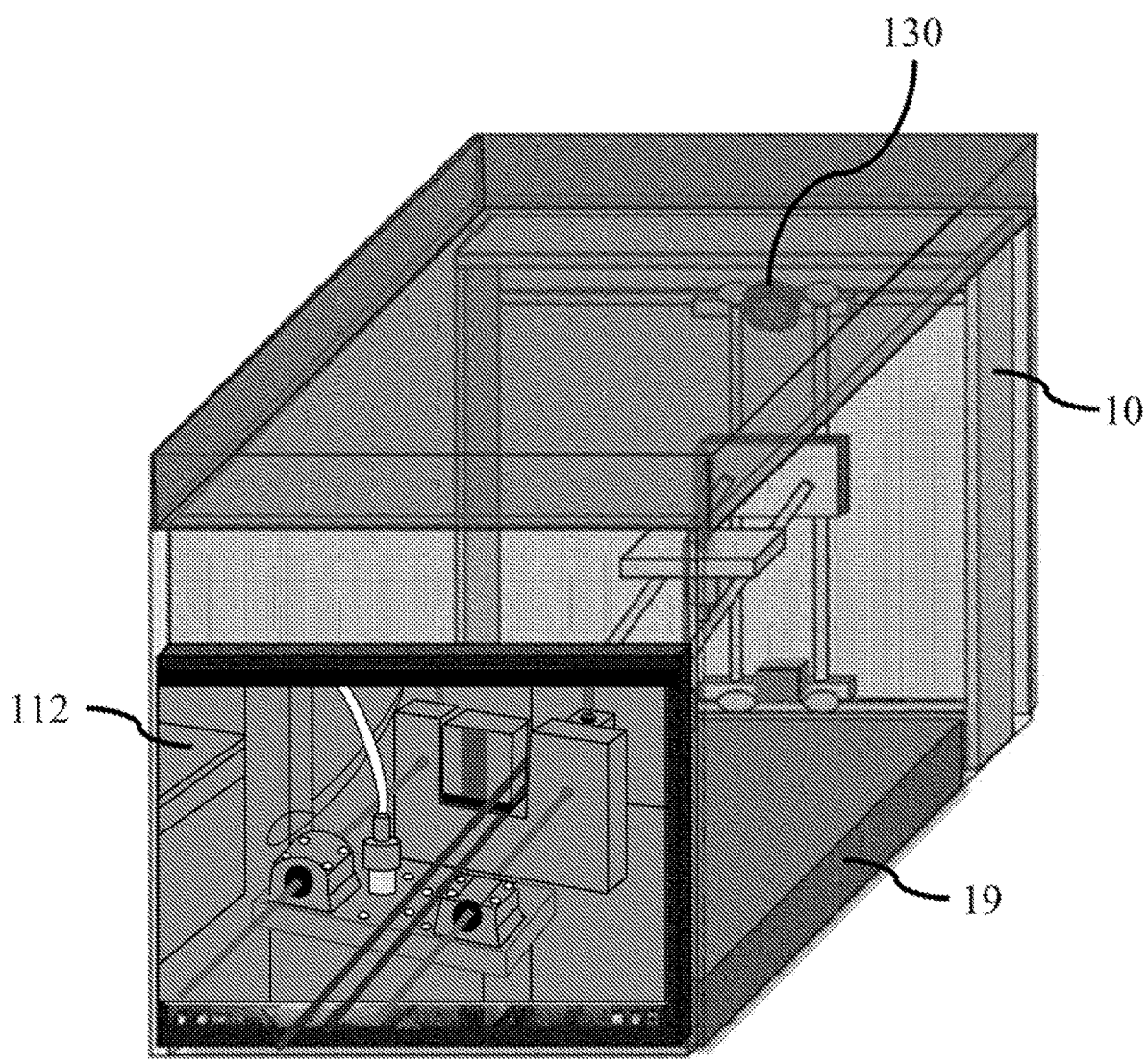
FIG. 5 is a schematic view of an operating system using a 3D printer according to an embodiment of the present invention.

Accordingly, the related content such as advertisements corresponding to the 3D work data may be displayed on the display panel 112, and simultaneously or alternatively, the image for the producing process of the 3D printer photographed by the camera 130 installed in the housing 110 may be displayed on the display panel 112 according to selection of the user on a touch screen of the display panel 112 (see FIG. 5). As such, the 3D printer housing device 100 provides multimedia contents such as advertisements, movies, and videos through a monitor, that is, the display panel, so that consumers may not get bored without wasting a long time while printing and a printer company provides advertising to consumers in the middle of printing so that the printer company may earn money from advertising fees. The user may stop actuation of the 3D printer 10 through the touch screen, etc., at any time while viewing and monitoring a printing process on the display panel 112.

The advertisement contents displayed on the display panel 112, the image of the camera 130, or the like may be displayed at a predetermined time by the operation control unit 122, and a time zone of displayed contents, a content change, or a content image, and the image of the camera 130 of the contents displayed on the display panel 112 may be screen-switched.

In addition, according to the relay of the operating platform 200, the overall control of the control device of the 3D printer housing device 100 in the user terminal 300 is possible, and accordingly, the operation control unit 122 of the 3D printer housing device 100 may transmit and provide the image displayed on the display panel 112 to the user terminal 300. Besides, the printer control unit 121 may control the 3D printer housing device 100 to print and produce the 3D object according to original image data which is 3D work data transmitted from the user terminal 300 and the printer control unit 121 may control the 3D printer housing device 100 to print and produce the 3D object and in this case, during the producing, the operation control unit 122 of the 3D printer housing device 100 may provide the original image and an image for an entire producing process of the corresponding 3D object acquired through a camera 130 installed in the housing to the display panel 112 and further, transmit and provide the provided image even to the user terminal 300.

For example, when the user terminal 300 transmits image data regarding a face of a person, a photographic text, initials, caricatures, and the like, the 3D printer housing device 100 may print and produce the 3D object with materials including cookies, bread, chocolate, jelly, cream, and jam and the original image and an image during a producing process of the 3D object are displayed in the display panel on the spot and provided even to the user terminal 300 and compared and analyzed during printing.

As such, in the present invention, by operating the operating platform 200 on the network to support the IoT, it is possible to remotely control the printer and perform printing from a distance from the user terminal 300 using mobile functions, and to analyze and respond to the situation of equipment such as 3D printers and consumers in the field directly. In addition, it is possible to enable a system that preorders products with the image through a user terminal 300 on a network, such as the Internet, or prints and automatically keeps the ordered products in a printer installed on a wall surface such as a wall hanging, and automatically settles the products by a password in a keypad or the user terminal, and thereafter, directly picks up the product without a help of a clerk.

Furthermore, the operating platform 200 (or another server on the network) may separately recognize 3D printers of each 3D printer housing device 100 on the network by using the IOT function, and manage 3D object information such as information (e.g. picture, design, material, etc.) printed and produced and to be produced by the 3D printer housing device 100, feedback information, etc., in the database, and analyze data such as a design, a material, etc., for the 3D object printed and produced based on the accumulated information and determine satisfaction/preference/taste of the consumer, and actively use the satisfaction/preference/taste for advertisement/promotion afterwards. In addition, the 3D object selected by the user or the user terminal 300 among the managed 3D object information may be supported to be produced by the 3D printer 10 of the 3D printer housing device 100 through online automatic payment. At this time, the operating platform 200 (or another server on the network) may provide the image for the producing process of the 3D object obtained through the camera 130 installed in the housing 110 to the display panel 112 or the user terminal 300 so as to be referred for precise comparison analysis with the related 3D object previously produced by the user, etc.

In addition, the operating platform 200 may provide the corresponding schematic information on the analysis result to the user terminal 300. In addition, based on the accumulated information, the operating platform 200 may afterwards analyze big data on strategic service sales, company operations, and safety status of equipment such as the 3D printer housing device 100, and directly provide a meaningful analysis result applicable to an advertisement contract with an advertising company on the spot. In addition, when producing any design is required, the 3D printer housing device 100 sends a signal to the operating platform 200 and a design made by a design company is transmitted to the 3D printer housing device 100 through the operating platform 200 to allow the 3D printer 10 to download and print the corresponding information.

In some cases, the operating platform 200 on a cloud web may monitor the multimedia contents such as the advertisements, texts, movies, e-mails, and videos or information on an operation state/fatigues of the 3D printer 10 in the housing 110, user recognition, usage time, and the like for each equipment and/or user of the 3D printer housing device 100 and support uploading the multimedia contents or information on a predetermined cloud server or transmitting/receiving data for required social network information to/from the cloud server. That is, useful information including (commercial) advertisements or other multimedia contents may be promoted by interworking with the cloud server on the network in real time through the 3D printer housing device 100.

In addition, the housing 110 may include a sensor for sensing temperature, humidity, an event, an accident, and the like in real time. A server on the network, that is, the operating platform 200 or the cloud server on the cloud web may receive and analyze the sensor information from the operation control unit 122 and selectively provide an advertisement according to seasons and environments (e.g., rain, snow, clouds, sunny, etc.) to the display panel of the 3D printer housing device 100 through the operation control unit 122.

As described above, according to the operating system 500 using the advertisement-type 3D printer according to the present invention, by providing a multimedia content such as advertisements, movies, videos through a monitor provided in the 3D printer 10, consumers may not get bored without time spent on printing in the middle of printing. The printer company can also provide advertising to consumers in the middle of printing to make money with advertising rates. In addition, by operating the platform on the network to support the IoT, it is possible to remotely control the printer and perform printing from a distance using mobile functions, and to analyze and respond to the situation of equipment such as 3D printers and consumers in the field directly. In addition, it is possible to enable a system that preorders products with the image through a user terminal on a network, such as the Internet, or prints and automatically keeps the ordered products in a printer installed on a wall surface such as a wall hanging, and automatically settles the products by a password in a keypad or the user terminal, and thereafter, directly picks up the product without a help of a clerk.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from a scope without departing from an essential characteristic of the present invention. Accordingly, the spirit of the present invention should not be defined only by the described embodiments, and it should be appreciated that claims to be described below and all technical spirit which is equivalent to the claims or equivalently modified is included in the claim of the present invention.

What is claimed is:

1. A 3D printer operating system comprising:
   a housing with one or more display panels on an outer surface as a form to surround a 3D printer; and
   a control device controlling opening/closing of a door surface of the housing according to an opening/closing request of a user and performing operation control of the 3D printer installed in the housing and operation control of the display panel,
   wherein the control device controls to extract related contents corresponding to 3D work data from a memory and reproduce the extracted contents on the display panel while controlling the 3D printer to produce a 3D object according to the 3D work data, and
   wherein the control device includes Arduino board hardware for controlling the 3D printer, and Raspberry Pi hardware for controlling the display panel and performs control of an entire system by interworking both hardware.

2. The 3D printer operating system of claim 1, further comprising:
   a camera installed in the housing and photographing a producing process of the 3D printer,
   wherein the control device selectively displays an image of the camera or the related contents on the display panel according to an image request of the user.

3. The 3D printer operating system of claim 1, wherein the 3D printer as a printer of a form installed on a wall surface or a desktop form occupying a space in a desk or a floor is a form in which a printer head movable on an X axis, a Y axis, and a Z axis sprays a material onto a worktable to produce the 3D object according to control of the control device and promotes useful information including advertisements or other multimedia contents by interworking with a cloud server on a network in real time.

4. The 3D printer operating system of claim 1, wherein the control device interworks with a user terminal according to a relay of a platform on the network,
   overall control of the control device through the user terminal is possible, and
   the control device transmits and provides the image displayed on the display panel to the user terminal.

5. The 3D printer operating system of claim 1, wherein the control device interworks with the user terminal according to the relay of the platform on the network and while producing the 3D object according to original image data as the 3D work data transmitted by the user terminal, the control device provides a corresponding original image and an image for the 3D object obtained through the camera installed in the housing to the display panel and transmits and provides the images to the user terminal.

6. A 3D printer operating system comprising:
   a housing with one or more display panels on an outer surface as a form to surround a 3D printer; and
   a control device controlling opening/closing of a door surface of the housing according to an opening/closing request of a user and performing operation control of the 3D printer installed in the housing and operation control of the display panel, wherein the control device controls to extract related contents corresponding to 3D work data from a memory and reproduce the extracted contents on the display panel while controlling the 3D printer to produce a 3D object according to the 3D work data, and wherein a server on the network, which senses a temperature, a humidity, an event, or an accident in the housing and receives transmitted sensor information provides to the display panel an advertisement according to seasons or environments by analyzing the sensor information.

7. A 3D printer operating system comprising:

a housing with one or more display panels on an outer surface as a form to surround a 3D printer; and a control device controlling opening/closing of a door surface of the housing according to an opening/closing request of a user and performing operation control of the 3D printer installed in the housing and operation control of the display panel, wherein the control device controls to extract related contents corresponding to 3D work data from a memory and reproduce the extracted contents on the display panel while controlling the 3D printer to produce a 3D object according to the 3D work data, wherein by interworking with the server on the network, the server stores and manages 3D object information including information on a 3D object produced or to be produced by the 3D printer, which includes a picture, a design, or a material in a database and supports the 3D printer to produce the 3D object selected among the 3D object information through online payment, and wherein so as to enable precise comparison analysis with the related 3D object previously produced, the server provides to the display panel the image for the producing process of the 3D object obtained through the camera installed in the housing.

* * * * *